United States Patent Office 2,975,209
Patented Mar. 14, 1961

2,975,209

PREPARATION OF DIALKYL ESTERS OF TEREPHTHALIC ACID

Jan A. Bos and Harm N. Mulder, Geleen, Netherlands, assignors to Stamicarbon N.V., Heerlen, Netherlands No Drawing. Filed Apr. 4, 1957, Ser. No. 650,548

1 Claim. (Cl. 260—475)

The present invention relates to the preparation of dialkyl esters of terephthalic acid.

It is known that dialkyl esters of terephthalic acid can be produced by reacting the acid with an alkanol containing 1 to 4 carbon atoms per molecule in the presence of concentrated sulfuric acid. This esterification has to be carried out with an excess of alcohol. Considerable losses of alcohol are normally involved, since large quantities of dialkyl ether are formed.

In order to avoid such losses, it has been proposed therefore to make use of catalysts other than sulfuric acid, such as zinc oxide and lead oxide or zinc and lead salts of weak acids, e.g., zinc borate. In such cases, a reaction period of at least one hour is required. According to another proposal, the long reaction period needed in this esterification may be shortened by passing the alcohol in the vapor phase through solid terephthalic acid at temperatures from 100 to 310° C. but in this method part of the alcohol is converted into dialkyl ether.

It is an object of the present invention to form lower dialkyl esters of terephthalic acid using sulfuric acid as a catalyst without the formation of substantial quantities of dialkyl ether by-product.

An additional object is to form lower dialkyl terephthalates in good yields using a relatively short reaction time.

A further object is to develop an efficient continuous process for forming lower dialkyl terephthalates.

Still further objects and the entire scope of applicability of the present invention will become apparent from the detailed description given hereinafter; it should be understod, however, that the detailed description and specific examples, while indicating prefered embodiments of the invention, are given by way of illustration only, since various changes and modifications within the spirit and scope of the invention will become apparent to those skilled in the art from this detailed description.

It has now been found that lower dialkyl esters of terephthalic acid can be produced in good yields and with a minimum of by-products in the presence of sulfuric acid, c.q. the corresponding monoalkylsulfate, as catalyst by using reaction conditions recited below.

According to the present invention, there is utilized a process for the production of dialkyl esters of terephthalic acid with alkanols containing not more than 4 carbon atoms per molecule comprising passing as a continuous current a mixture of the acid and alcohol with sulfuric acid at a pressure sufficient to maintain the alcohol in the liquid state, through a reaction zone at a temperature of 100 to 200° C., and in such a way that turbulence is set up in the mixture at least in the first part of its passage through the reaction zone. Turbulence is evidenced by a Reynolds number of at least 500.

The alcohols which can be used include methyl alcohol, ethyl alcohol, n-propyl alcohol, isopropyl alcohol, n-butyl alcohol, secondary butyl alcohol, tertiary butyl alcohol and isobutyl alcohol to form the corresponding esters, e.g., dimethyl terephthalate, diethyl terephthalate, di n-propyl terephthalate, di n-butyl terephthalates, etc.

In the process according to the invention the passage of the reaction mixture through the first part of the reaction zone in a turbulent flow brings about good mixing of the solid terephthalic acid with the alcohol and the sulfuric acid so that the formation of the monoalkyl ester is accelerated. After the formation of the monoester, the whole reaction mixture is liquid and, hence, special measures no longer need be taken to obtain a good contact.

Generally, it is not necessary to keep the reaction mixture in turbulent current during more than ⅓ part of its passage through the reaction zone from the moment it enters this zone, although turbulence can be maintained through the entire reaction. If turbulence is not maintained during the whole of the passage, it is possible to simplify the apparatus, e.g., there can be used a wide tube with a diameter of, e.g., 20 cm., fitted with a narrower entrance part with a diameter of, e.g., 3 cm., in which narrower part the turbulence can easily be effected. The turbuence can be accomplished by providing baffles or perforated plates in the tube, as well as by employing a pulsatory feed of the reaction mixture. Turbulence should be maintained for at least the first ¹⁄₁₀ part of the passage of the mixture through the reaction zone.

Long passage periods should be avoided, as these promote the formation of the undesired dialkyl ether by-product. Preferably, a passage period of only one to three minutes is used. The use of shorter periods than one minute leads to incomplete esterification and, hence, requires additional recycling for complete esterification. However, a reaction time of as little as 30 seconds can be employed.

Provided the period of reaction is sufficiently short, it has been found that the process according to the invention enables dialkyl esters of terephthalic acid to be produced in the presence of sulfuric acid as a catalyst with only small losses of alcohol due to the formation of dialkyl ethers and practically without any other by-products being formed. The period of reaction will generally be less than ten minutes; and preferably the period is one to 3 minutes, as previously set forth.

Furthermore, it is recommendable to keep the quantity of sulfuric acid small, in order to prevent the formation of dialkyl ether. It is preferred to use from 40–100% by weight of sulfuric acid calculated on the weight of terephthalic acid, although the amount of sulfuric acid can range from 10% to 300% of the weight of the terephthalic acid. The sulfuric acid used may be 96% sulfuric acid, or it may have a lower concentration, e.g., 50%. In general, the sulfuric acid can range from 10% to 96% in concentration.

During the reaction part or all of the sulfuric acid is converted into mono-alkylsulfate by reaction with the alcohol. If so desired in the present process instead of sulfuric acid a mono-alkylsulfate may be used, the alkyl group of which containing 1 to 4 carbon atoms.

An excess of alkanol is normally employed. Usually, 60 mols to 100 mols of alkanol are utilized per mol of terephthalic acid. Normally, 3% to 12% of water based on the weight of the total composition is employed, although the water can be completely eliminated.

The reaction is carried out at a pressure at which the alkanol is liquid. Usually, this will be superatmospheric at the temperature of the reaction in order to keep the alcohol in the reaction mixture in the liquid phase. Pressures higher than 50 atmospheres need not be applied, but can be used if desired. Usually, the pressure is about 10 atmospheres. In this way it is possible to obtain terephthalic diesters from alkanols containing one to 4 carbon atoms per molecule with a minimum of by-product formation. To obtain esters from higher alcohols, it is recommended that the diesters of the lower alcohols be first prepared and then the higher esters formed by ester interchange by reacting these lower alcohol diesters with higher alcohols.

*Example I*

A reaction mixture consisting of:
5.2% by weight terephthalic acid
1.0% by weight sulfuric acid (100%)
3.4% by weight water
90.4% by weight methanol was continuously passed through a spiral reaction tube (diameter 6 mm., length 12 meters). The reaction mixture was pulsatorily fed into the tube with 120 pulsations per minute so that a turbulent current was formed in this tube.

The temperature in the tube was maintained at 175° C. and the pressure was 25 atmospheres. The flow rate was adjusted so that it took the reaction mixture 90 seconds to pass through the tube. After passing through the reaction tube, the reaction mixture was cooled and the pressure reduced to 1 atmosphere.

The solid substances were separated from the reaction mixture while the liquids were used for the preparation of fresh starting mixture for the reaction.

In this way, 90% of the terephthalic acid was converted into the dimethyl ester and 10% into the monomethyl ester.

The monomethyl ester remained in solution in the methanol, so that the separated solid reaction product consisted entirely of pure dimethyl terephthalate. From each one kg. of starting mixture, 54 g. of di-methyl terephthalate were obtained.

*Example II*

A reaction mixture consisting of:
5.2% by weight terephthalic acid
4.2% by weight sulfuric acid (100%)
3.4% by weight water
87.2% by weight methanol was continuously passed through a spiral reaction tube (diameter 6 mm., length 6 meters) and subsequently through a wider tube (diameter 15 mm., length 6 meters). In the former tube, turbulence was effected by pulsatory feed.

The temperature in the tube was maintained at 125 to 130° C. and the pressure was 10 atmospheres. The flow rate was adjusted to a passage period of 160 seconds, of which 22 seconds were in the narrow tube and the balance were in the wider tube.

By this process, substantially the same results were obtained as mentioned in Example I. 90% of the terephthalic acid was converted into the dimethyl ester and the balance to the monomethyl ester.

Similar results are obtained when the other alkanols having 2 to 4 carbon atoms are used in place of methanol in the above examples.

*Example III*

A reaction mixture consisting of:
6.4% by weight terephthalic acid
3.0% by weight mono-isopropylsulfate
3.1% by weight water
87.5% by weight isopropanol was continuously passed through the same reaction tube as used in Example I. The reaction mixture was pulsatorily fed into the tube with 120 pulsations per minute so that a turbulent current was formed. The temperature in the tube was maintained at 125–130° C. and the pressure was 12 atmospheres. The flow rate was adjusted so that it took the reaction mixture 170 seconds to pass through the tube. After passing through the reaction tube, the reaction mixture was cooled and the pressure reduced to atmospheric pressure.

The solid substances were separated from the reaction mixture by a centrifuge and the liquids were used for the preparation of a fresh starting mixture for the reaction.

In this continuous way 89% of the terephthalic acid was converted into its di-isopropylester and the balance into the mono-isopropylester.

From each one kg. of starting mixture 70 g. of di-isopropyl terephthalate were obtained.

We claim:

In a process for the production of dimethyl terephthalate from methanol and terephthalic acid in which process more than 2 mols of methanol are used per mol of terephthalic acid and in which process a suspension of solid terephthalic acid in liquid methanol in admixture with a liquid catalyst selected from the group consisting of sulfuric acid and monomethyl sulfate is continuously passed into a reaction zone heated to a temperature of at least 100° C., the improvement comprsing employing an amount of catalyst not over 100% by weight of the terephthalic acid present in said suspension, passing said suspension into a first reaction zone, allowing said terephthalic acid to react with said methanol while maintaining turbulence in the mixture in the absence of a gaseous phase under a pressure sufficient to maintain said methanol in a liquid phase at a temperature of 100 to 200° C. to form the monomethyl ester of terephthalic acid as a constituent of an entirely liquid reaction mixture in said first zone, continuously passing said liquid reaction mixture into a second zone, allowing said liquid reaction mixture in the absence of a gaseous phase to further react to form the dimethyl ester of terephthalic acid in said second zone, subsequently discharging the reaction mixture from said second zone, cooling the discharged reaction mixture to a temperature below 100° C. and separating solid dimethyl terephthalic acid from the reaction product, said reaction being completed in not over ten minutes.

References Cited in the file of this patent

UNITED STATES PATENTS

| | | |
|---|---|---|
| 2,459,014 | Cavanaugh et al. | Jan. 11, 1949 |
| 2,462,601 | Bohrer | Feb. 22, 1949 |
| 2,479,066 | Gresham | Aug. 16, 1949 |
| 2,644,009 | Cash et al. | June 20, 1953 |
| 2,759,967 | Cash et al. | Aug. 21, 1956 |
| 2,853,516 | Louthan | Sept. 23, 1958 |
| 2,876,252 | Lotz | Mar. 3, 1959 |